United States Patent
Yonekura et al.

(10) Patent No.: US 11,933,772 B2
(45) Date of Patent: Mar. 19, 2024

(54) ABSORBANCE DETECTOR FOR CHROMATOGRAPH AND REFERENCE POSITION DETECTION METHOD

(71) Applicant: SHIMADZU CORPORATION, Kyoto (JP)

(72) Inventors: Takuya Yonekura, Kyoto (JP); Masato Watanabe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 389 days.

(21) Appl. No.: 17/422,274

(22) PCT Filed: Jan. 17, 2019

(86) PCT No.: PCT/JP2019/001353
§ 371 (c)(1),
(2) Date: Jul. 12, 2021

(87) PCT Pub. No.: WO2020/148878
PCT Pub. Date: Jul. 23, 2020

(65) Prior Publication Data
US 2022/0091077 A1 Mar. 24, 2022

(51) Int. Cl.
*G01N 30/74* (2006.01)
(52) U.S. Cl.
CPC .................................... *G01N 30/74* (2013.01)
(58) Field of Classification Search
CPC ...................................................... G01N 30/74
See application file for complete search history.

(56) References Cited

U.S. PATENT DOCUMENTS

2002/0030821 A1* 3/2002 Yokota ...................... G01J 3/08
356/434

FOREIGN PATENT DOCUMENTS

| JP | 04-031747 A | 2/1992 |
|----|-------------|--------|
| JP | 2002-081991 A | 3/2002 |
| WO | 2013/140617 A1 | 9/2013 |

OTHER PUBLICATIONS

Office Action in corresponding Chinese Patent Application No. 201980088823.5 dated Jul. 20, 2023, with English machine translation.

(Continued)

*Primary Examiner* — Jamel E Williams
(74) *Attorney, Agent, or Firm* — Renner, Otto, Boisselle & Sklar, LLP (57) ABSTRACT

An absorbance detector for a chromatograph includes a light source, a flow cell that receives light generated by the light source, a photodetector that detects light transmitted through the flow cell, a light shield member that shields at least part of the light generated from the light source to the flow cell, a motor that rotates the light shield member to change the light shield member between a light-shielding state where the light shield member shields at least part of the light generated from the light source to the flow cell and a non-light-shielding state where the light shield member does not shield the light generated from the light source to the flow cell, and a reference position detector that rotates the motor and also acquires a change in amount of light received by the photodetector to detect a reference position of the light shield member in a rotation direction of the light shield member based on the acquired change in the amount of the received light.

8 Claims, 6 Drawing Sheets

(56) References Cited

OTHER PUBLICATIONS

Notice of Reasons for Refusal for corresponding Japanese Patent Application No. 2020-566061, with English language machine translation, dated May 17, 2022.
International Search Report for corresponding Application No. PCT/JP2019/001353, dated Apr. 9, 2019.
Written Opinion for corresponding Application No. PCT/JP2019/001353, dated Apr. 9, 2019 (machine translation).

* cited by examiner

ABSORBANCE DETECTOR FOR CHROMATOGRAPH AND REFERENCE POSITION DETECTION METHOD

TECHNICAL FIELD

The present invention relates to an absorbance detector for a chromatograph and a reference position detection method.

BACKGROUND ART

An absorbance detector is used to detect components of a sample separated in an analysis column in a liquid chromatograph, for example. The absorbance detector includes a light source, a shutter, an optical system, a flow cell, and a photodetector (See Patent Document 1, for example). An eluate is supplied from the analysis column to the flow cell. Light emitted from a light source is led to the flow cell by the optical system. The photodetector detects a temporal change in intensity of light in each wavelength range transmitted through the flow cell. A shutter is provided to be rotatable between a state where the light emitted from the light source to the flow cell is shielded by a shutter driving mechanism including a motor and a state where the light emitted from the light source to the flow cell is not shielded.

[Patent Document 1] WO 2013/140617 A1

SUMMARY OF INVENTION

Technical Problem

When the light from the light source is shielded by the shutter rotated by the motor, the shutter needs to be substantially perpendicular to the light led from the light source to the flow cell. In this case, an angle of the shutter is adjusted by controlling a rotation angle of the motor from a reference position (an origin position) of the shutter. The reference position here refers to a reference rotation position of the shutter. When the absorbance detector is turned off, a rotation axis of the motor is stopped at an arbitrary rotation position. As such, the shutter also stops at an arbitrary angle and does not necessarily stop at the reference position. Therefore, it is necessary to detect the reference position of the shutter with respect to an initial position of the shutter when the absorbance detector is turned on. An encoder is used to detect the reference position of the shutter.

However, costs of parts of the encoder, wiring for the encoder, and electric power supplied to the encoder are required. Also, the encoder has a life and thus requires maintenance.

An object of the present invention is to provide an absorbance detector for a chromatograph and a reference position detection method that are capable of detecting a reference position of a light shield member at low cost and with less time and labor.

Solution to Problem

An absorbance detector for a chromatograph includes a light source, a flow cell that receives light generated by the light source, a photodetector that detects light transmitted through the flow cell, a light shield member that shields at least part of the light generated from the light source to the flow cell, a motor that rotates the light shield member to change the light shield member between a light-shielding state where the light shield member shields at least part of the light generated from the light source to the flow cell and a non-light-shielding state where the light shield member does not shield the light generated from the light source to the flow cell, and a reference position detector that rotates the motor and also acquires a change in amount of light received by the photodetector to detect a reference position of the light shield member in a rotation direction of the light shield member based on the acquired change in the amount of the received light.

A reference position detection method is a reference position detection method of detecting a reference position of a light shield member that shields at least part of light generated from a light source to a flow cell in an absorbance detector and includes the steps of: generating the light by the light source in the absorbance detector, rotating the light shield member to change the light shield member between a light-shielding state where the light shield member shields at least part of the light generated from the light source to the flow cell and a non-light-shielding state where the light shield member does not shield the light generated from the light source to the flow cell, detecting the light transmitted through the flow cell by a photodetector during rotation of the light shield member, and acquiring a change in amount of light received by the photodetector due to the rotation of the light shield member to detect the reference position in a rotation direction of the light shield member based on the acquired change in the amount of the received light.

Advantageous Effects of Invention

According to the present invention, it is possible to detect a reference position of a light shield member in an absorbance detector for a chromatograph at low cost and with less time and labor.

DESCRIPTION OF EMBODIMENTS

An absorbance detector for a chromatograph and a reference position detection method according to an embodiment will be described in detail below with reference to the drawings.

(1) Configuration of Absorbance Detector

Figure 1:
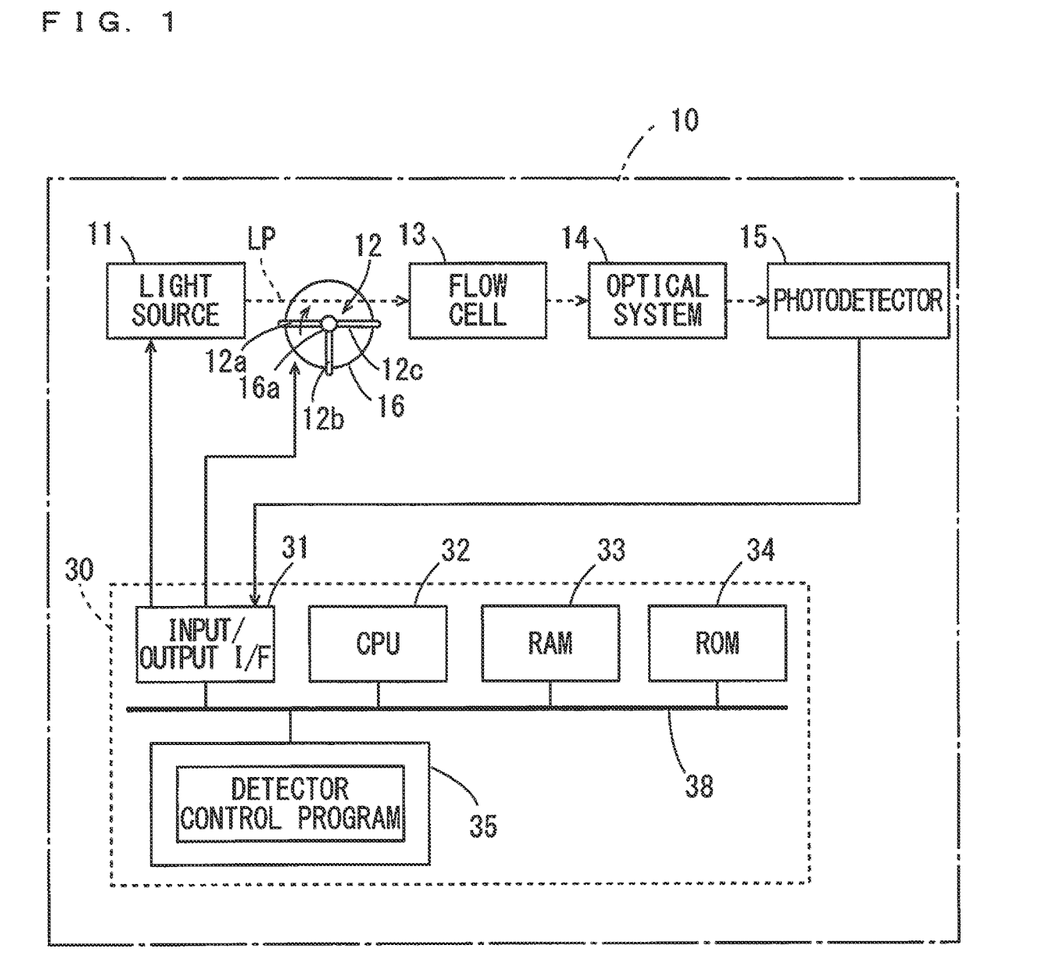
FIG. 1 is a block diagram showing a configuration of an absorbance detector for a chromatograph according to an embodiment.

FIG. 1 is a block diagram showing a configuration of an absorbance detector for a chromatograph according to an embodiment. The absorbance detector according to this embodiment is used for a liquid chromatograph, for example.

An absorbance detector 10 of FIG. 1 includes a light source 11, a light shield member 12, a flow cell 13, an optical system 14, a photodetector 15, a motor 16, and a detector controller 30. In this embodiment, the light source 11 is a deuterium lamp, for example.

Light generated by the light source 11 is led to the flow cell 13 by an optical system (not shown) including a condensing mirror, etc. The light shield member 12 is disposed in a light path LP between the light source 11 and the flow cell 13. The light shield member 12 is attached to a rotation axis 16a of the motor 16. Details of the light shield member 12 will be described later below.

A mobile phase and a sample supplied from an analysis column of a liquid chromatograph, for example, flow into the flow cell 13. The optical system 14 includes a mirror, a diffraction grating, etc. and leads the light transmitted through the flow cell 13 to the photodetector 15. The photodetector 15 includes a photodiode or a photodiode array, for example, and detects a temporal change in intensity of light in each wavelength range.

The detector controller 30 includes an input output I/F (interface) 31, a CPU (central processing unit) 32, a RAM (random access memory) 33, a ROM (read only memory) 34, and a storage device 35. The input output I/F (interface) 31, the CPU 32, the RAM 33, the ROM 34, and the storage device 35 are connected to a bus 38.

The storage device 35 includes a storage medium such as a semiconductor memory or a memory card and stores a detector control program. The RAM 33 is used as a work area of the CPU 32. The ROM 34 stores a system program. The CPU 32 executes the detector control program stored in the storage device 35 on the RAM 33 to control the light source 11 and the motor 16 via the input output I/F 31 and also receives an output signal of the photodetector 15 via the input output I/F 31. Also, the detector control program includes a reference position detection program. The CPU 32 executes the reference position detection program stored in the storage device 35 on the RAM 33, so that a reference position detection method described below is carried out. The input output I/F 31 is connected to an analysis controller 50 (FIG. 7) of the liquid chromatograph, for example.

(2) Configuration of Light Shield Member 12

Figure 2:
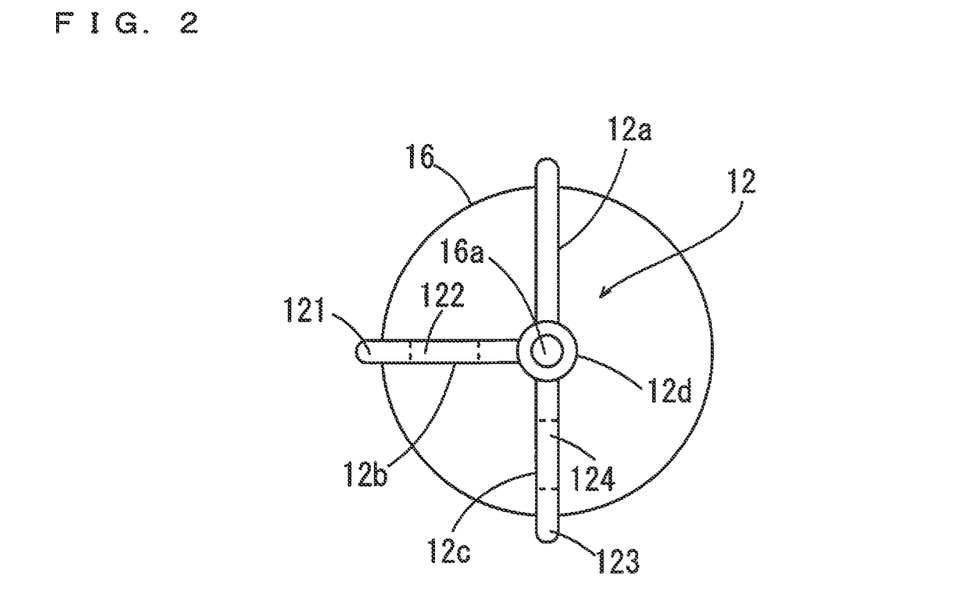
FIG. 2 is a schematic diagram showing a configuration of a light shield member.

FIG. 2 is a schematic diagram showing a configuration of the light shield member. As shown in FIG. 2, the light shield member 12 is constituted by a plate-shaped shutter 12a, a plate-shaped first filter 12b, a plate-shaped second filter 12c, and a cylindrical attachment member 12d. The shutter 12a, the first filter 12b, and the second filter 12c are integrally attached to an outer peripheral surface of the attachment member 12d. In this embodiment, the shutter 12a and the first filter 12b form a 90 degree angle, and the first filter 12b and the second filter 12c form a 90 degree angle. The attachment member 12d is fitted in the rotation axis 16a of the motor 16. The rotation axis 16a of the motor 16 is rotated, so that the shutter 12a, the first filter 12b, and the second filter 12c are integrally rotated.

Figure 3:
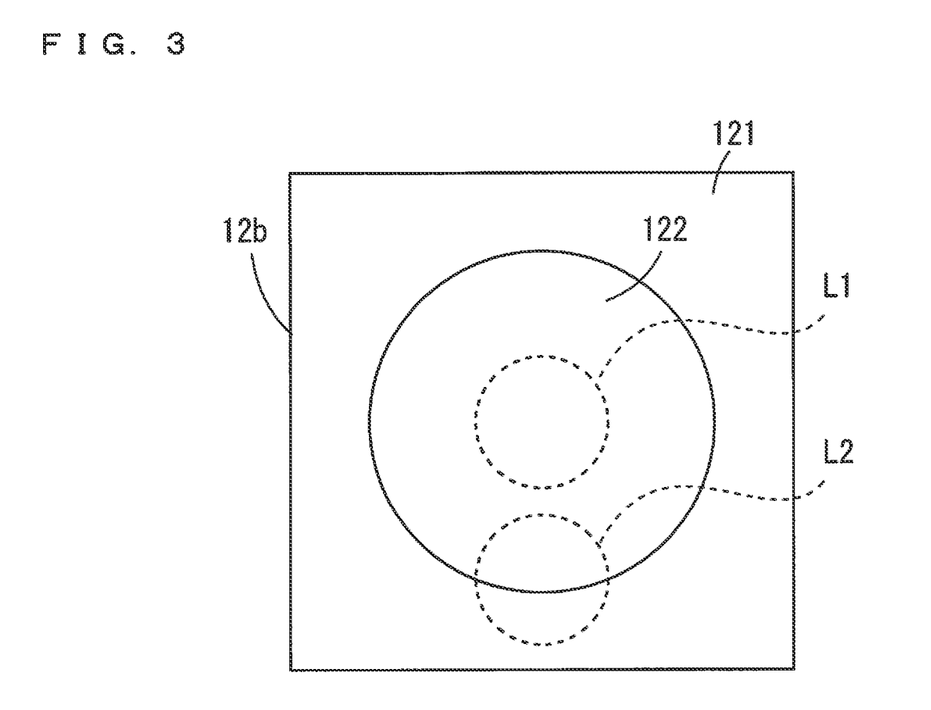
FIG. 3 is a diagram showing a configuration of a first filter.

FIG. 3 is a diagram showing a configuration of the first filter 12b. As shown in FIG. 3, the first filter 12b has a configuration in which a circular filter member 122 is provided in a center of a rectangular light shield plate 121. The filter member 122 has a characteristic of transmitting light in an ultraviolet wavelength range, for example. In a case where the first filter 12b of FIG. 3 is perpendicular to the light path LP of FIG. 1, the light generated from the light source 11 is perpendicularly incident on the first filter 12b. In this case, the light is incident on a region L1 in a central portion of the filter member 122. In a case where the first filter 12b is inclined with respect to the light path LP, the light generated from the light source 11 is obliquely incident on the first filter 12b. In this case, the light is incident on a region L2 including a boundary between the filter member 122 and the light shield plate 121. Thus, the amount of light led to the flow cell 13 decreases.

Similarly, the second filter 12c of FIG. 2 has a configuration in which a circular filter member 124 is provided in a center of a rectangular light shield plate 123. The filter member 124 has a characteristic of transmitting light in a wavelength range different from that of the filter member 122.

In this embodiment, the motor 16 is a stepping motor. The detector controller 30 of FIG. 1 applies a pulse signal including control pulses and a rotation direction indication signal that indicates a rotation direction to the motor 16. The rotation axis 16a is rotated by a certain angle in a direction indicated by the rotation direction indication signal each time a control pulse is applied to the motor 16.

(3) Example of Change in Amount of Light Received by Photodetector 15

Figure 4:
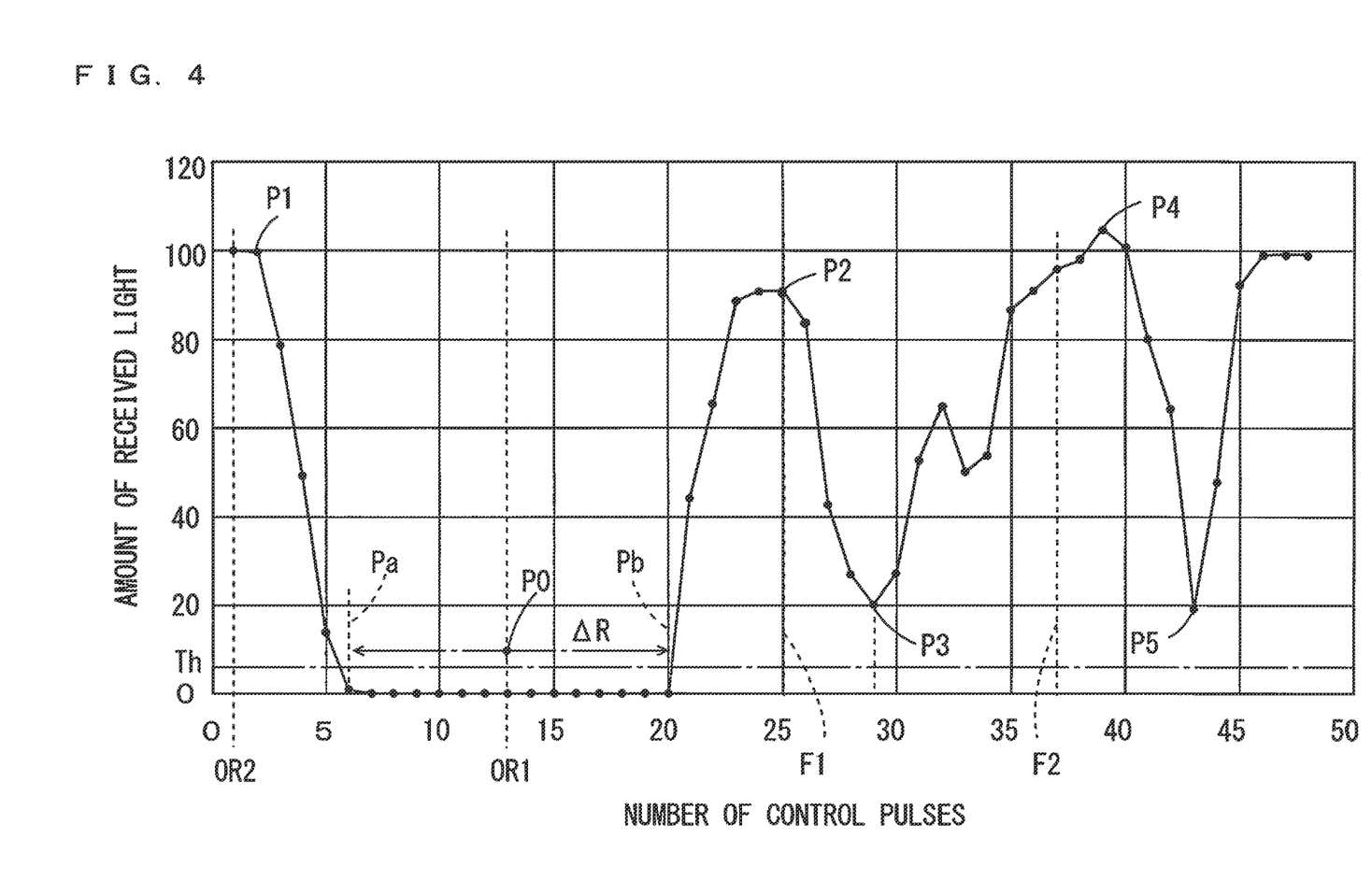
FIG. 4 is a diagram showing one example of a change in amount of light received by a photodetector depending on the number of control pulses applied to a motor.

FIG. 4 is a diagram showing one example of a change in amount of light received by the photodetector 15 depending on the number of control pulses applied to the motor 16. The ordinate of FIG. 4 represents the amount of light received by the photodetector 15, and the abscissa represents the number of control pulses applied to the motor 16 from the detector controller 30.

In the example of FIG. 4, when one control pulse is applied, the motor 16 is rotated by 7.5 degree. Thus, when 48 control pulses are applied to the motor 16, the motor 16 is rotated by 360 degree. Accordingly, the change in amount of light of FIG. 4 is acquired based on an output signal of the photodetector 15 when the motor 16 is rotated by 360 degree. A rotation angle of the motor 16 and the light shield member 12 is proportional to the number of control pulses. A rotation position of the light shield member 12 when the number of control pulses is 0 is an initial position.

In the change in amount of light of FIG. 4, the amount of received light decreases from a rotation position P1 and reaches 0 at a rotation position Pa. The amount of received light is kept at 0 in a range from the rotation position Pa to a rotation position Pb. The amount of received light indicates local maximum values at a rotation position P2 and a rotation position P4, and indicates local minimum values at a rotation position P3 and a rotation position P5.

In this embodiment, the reference position of the light shield member 12 is a rotation position at which the shutter 12a is perpendicular to the light path LP of FIG. 1. In this case, a rotation angle range in which the amount of received light is not more than a predetermined threshold value Th is detected as a light shield angle range ΔR. In the example of FIG. 4, the light shield angle range ΔR is a range from the rotation position Pa to the rotation position Pb. In the light shield angle range ΔR, a substantially entire amount of light from the light source 11 to the flow cell 13 is shielded by the shutter 12a. A center angle position P0 in the light shield angle range ΔR is determined as a reference position OR1 of the light shield member 12. The reference position OR1 need not exactly coincide with the center angle position P0 in the light shield angle range ΔR and may be determined to be an approximate center angle position. The approximate center angle position is an angle range in which variations in characteristics of the absorbance detector 10 are within an allowable range in a case where the angle of the light shield member 12 is controlled based on the reference position OR1. For example, the allowable angle range is set to, for example, −1% to +1%, −2% to +2%, −5% to +5% or −10% to +10% of the light shield angle range ΔR, for example.

In the example of FIG. 4, a rotation position at which the number of control pulses is 13 is the reference position OR1. Thus, when 13 control pulses are applied to the motor 16 from a state where the light shield member 12 is at the initial position, the shutter 12a becomes perpendicular to the light path LP. When 12 control pulses are further applied to the motor 16, the rotation position of the light shield member 12 is a filter position F1. In this case, the first filter 12b becomes perpendicular to the light path LP. When 12 control pulses are further applied to the motor 16, the rotation position of the light shield member 12 is a filter position F2. In this case, the second filter 12c becomes perpendicular to the light path LP.

(4) Functional Configuration of Detector Controller 30

Figure 5:
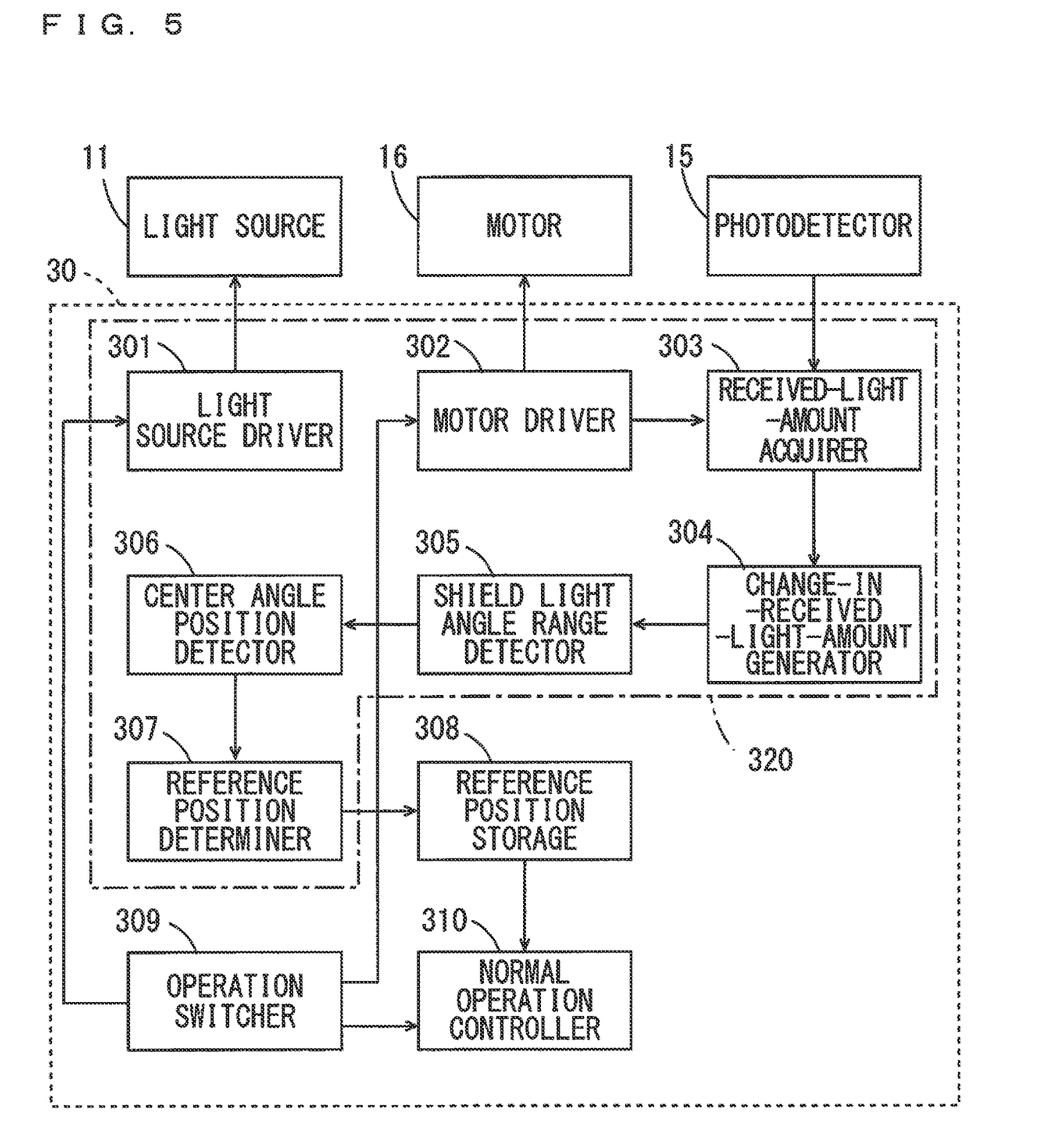
FIG. 5 is a block diagram showing a functional configuration of a detector controller of FIG. 1.

FIG. 5 is a block diagram showing a functional configuration of the detector controller 30 of FIG. 1. As shown in FIG. 5, the detector controller 30 includes a light source driver 301, a motor driver 302, a received-light-amount acquirer 303, a change-in-received-light-amount generator 304, a light shield angle range detector 305, a center angle position detector 306, a reference position determiner 307, a reference position storage 308, an operation switcher 309, and a normal operation controller 310. Functions of the above-described constituent elements (301 to 310) are implemented by the CPU 32 of FIG. 1 executing the detector control program being a computer program stored in a storage medium (recording medium) such as the storage device 35. Some or all of the constituent elements of the detector controller 30 may be implemented by hardware such as an electronic circuit. The reference position storage 308 is constituted by the RAM 33 of FIG. 1.

An operation of performing a reference position detection method is referred to as a reference position detection operation, and an operation of detecting absorbance is referred to as a normal operation.

The light source driver 301 turns on and off the light source 11. The motor driver 302 rotates the motor 16. The received-light-amount acquirer 303 acquires the amount of light received by the photodetector 15 based on an output signal of the photodetector 15. The change-in-received-light-amount generator 304 generates a change in the amount of received light based on the amount of received light acquired by the received-light-amount acquirer 303. The light shield angle range detector 305 detects a light shield angle range ΔR based on the change in the amount of received light generated by the change-in-received-light-amount generator 304. The center angle position detector 306 detects a center angle position P0 in the light shield angle range ΔR detected by the light shield angle range detector 305. The reference position determiner 307 determines an approximate center angle position in the light shield angle range ΔR as a reference position. In this embodiment, the reference position determiner 307 determines the center angle position P0 in the light shield angle range ΔR as a reference position OR1. The reference position storage 308 stores the reference position OR1 determined by the reference position determiner 307.

The operation switcher 309 switches between the reference position detection operation and the normal operation. During the normal operation, the normal operation controller 310 controls the turning on and off of the light source 11 and the operation of the motor 16, etc. and also receives the output signal of the photodetector 15.

(5) Reference Position Detection Method

Figure 6:
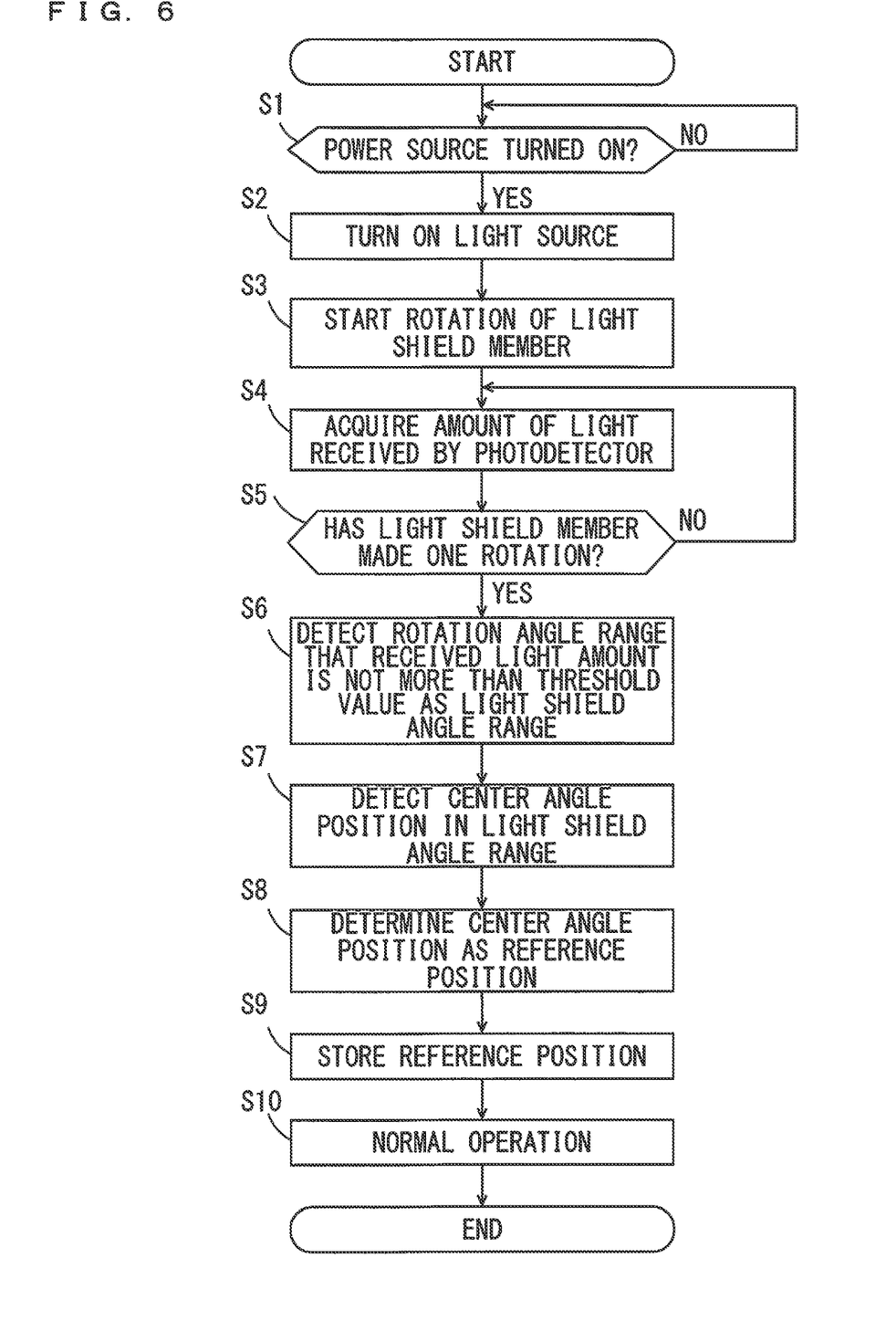
FIG. 6 is a flowchart showing a reference position detection method according to the embodiment.

FIG. 6 is a flowchart showing a reference position detection method according to the embodiment. The reference position detection method of FIG. 6 is performed by execution of the reference position detection program.

The operation switcher 309 determines whether a power source of the absorbance detector 10 is turned on (step S1). When the power source is turned on, the reference position detection operation is performed. In this case, the light source driver 301 turns on the light source 11 (step S2). The motor driver 302 applies control pulses to the motor 16 to start rotation of the light shield member 12 (step S3).

The received-light-amount acquirer 303 acquires the amount of light received by the photodetector 15 based on an output signal of the photodetector 15 (step S4). The motor driver 302 determines whether the light shield member 12 has made one rotation based on the number of control pulses applied to the motor 16 (step S5). In a case where the light shield member 12 has not made one rotation, the received-light-amount acquirer 303 returns to step S4 and acquires the amount of light received by the photodetector 15. In a case where the light shield member 12 has made one rotation, a change in the amount of received light due to the one rotation of the light shield member 12 is generated by the change-in-received-light-amount generator 304.

The light shield angle range detector 305 detects a rotation angle range in which the amount of received light is not more than a threshold value Th as the light shield angle range ΔR in the generated change in the amount of received light (step S6). The center angle position detector 306 detects the center angle position P0 in the light shield angle range ΔR (step S7). The reference position determiner 307 determines the center angle position P0 as the reference position OR1 (step S8). The reference position storage 308 stores the determined reference position OR1 (step S9). In the example of FIG. 4, the rotation position corresponding to 13 as the number of control pulses is the reference position OR1. The shutter 12a of the light shield member 12 is orthogonal to the light path LP at the rotation position corresponding to 13 as the number of control pulses.

Thereafter, the operation switcher 309 switches the reference position detection operation to the normal operation. Thus, the normal operation controller 310 performs the normal operation (step S10). In the normal operation, detection of absorbance is performed by the absorbance detector 10. In this case, the normal operation controller 310 controls the rotation angle of the light shield member 12 based on the reference position stored in the reference position storage 308. Thus, switching is performed among a state where the light generated by the light source 11 is shielded by the shutter 12a, a state where the light generated by the light source 11 is led to the flow cell 13, and a state where the light generated by the light source 11 is led to the flow cell 13 through the first filter 12b or the second filter 12c. When the normal operation is ended, the normal operation controller 310 turns off the light source 11.

With the above-described reference position detection method, the reference position detection method is performed in the case where the power source of the absorbance detector 10 is turned on. Thus, the reference position of the light shield member 12 is detected without use of an encoder.

(6) Liquid Chromatograph

Figure 7:
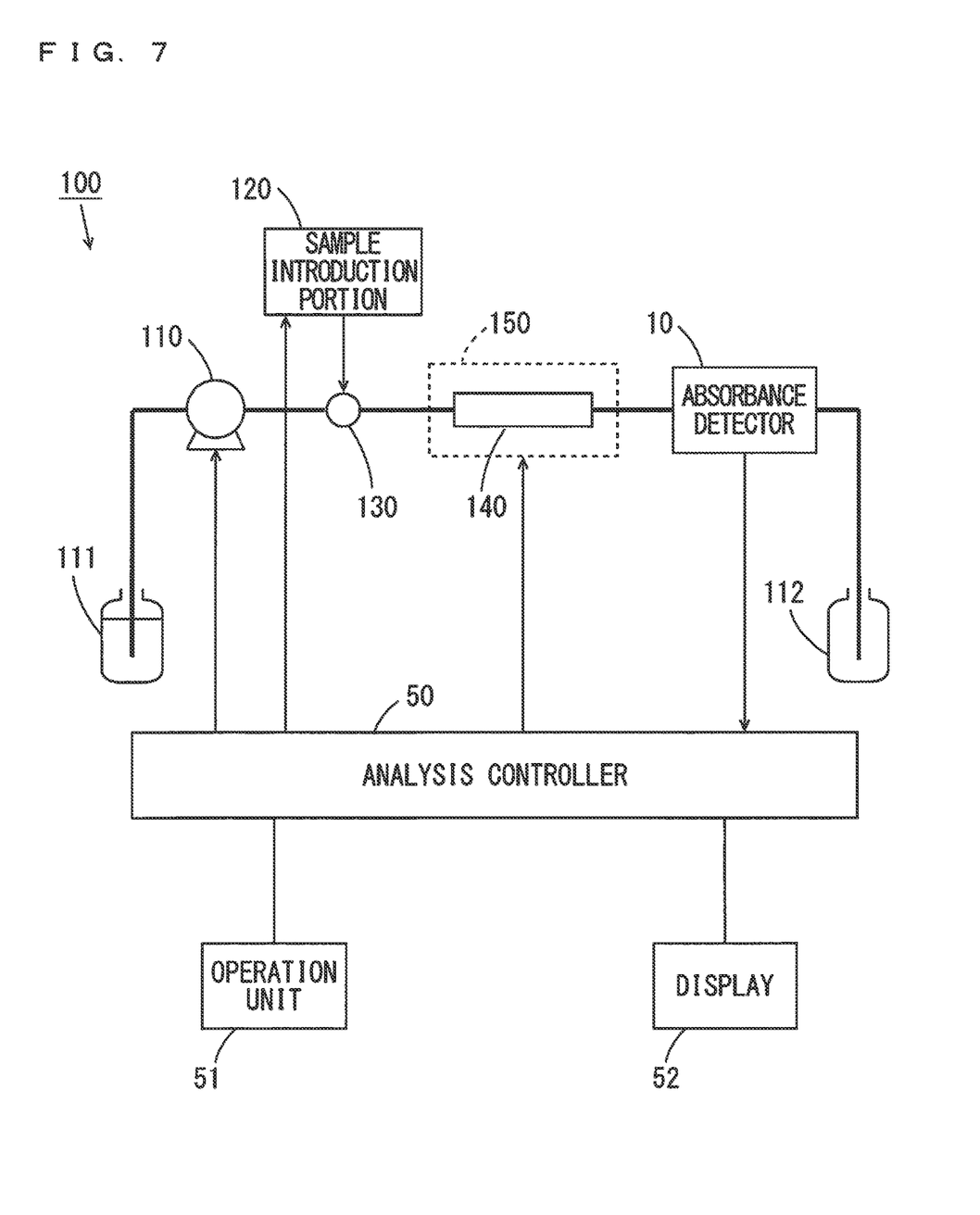
FIG. 7 is a block diagram showing a configuration of a liquid chromatograph including the absorbance detector of FIG. 1.

FIG. 7 is a block diagram showing a configuration of a liquid chromatograph including the absorbance detector 10 of FIG. 1.

A liquid chromatograph 100 of FIG. 7 includes a pump for a mobile phase 110, a sample introduction portion 120, an inlet port 130, an analysis column 140, a column oven 150, and an absorbance detector 10. The analysis column 140 is provided in the column oven 150. The column oven 150 maintains the analysis column 140 at a set temperature.

The pump 110 sucks a mobile phase (an eluent) in a mobile phase container 111 and supplies the mobile phase to the analysis column 140. The sample introduction portion 120 includes an autosampler or an injector, for example, and introduces a sample to be analyzed into the mobile phase at the inlet port 130. The mobile phase and the sample that have passed through the analysis column 140 flow through the flow cell 13 of the absorbance detector 10 (FIG. 1) and are then discharged into a waste liquid container 112.

The liquid chromatograph 100 includes an analysis controller 50, an operation unit 51, and a display 52. The operation unit 51 is used for the user to provide various instructions to the analysis controller 50. The analysis controller 50 controls the pump 110, the sample introduction portion 120, the column oven 150, and the absorbance detector 10. Also, the analysis controller 50 generates a chromatogram based on an output signal of the absorbance detector 10. The generated chromatogram is displayed on the display 52.

(7) Effects of Embodiment

In the absorbance detector 10 and the liquid chromatograph 100 according to this embodiment, the reference position OR1 of the light shield member 12 is detected based on a change in amount of light received by the photodetector 15 during the reference position detection operation before the normal operation. As such, an encoder is unnecessary for detecting the reference position OR1 of the light shield member 12. Thus, costs of parts of the encoder, wiring for the encoder, electric power supplied to the encoder, and maintenance of the encoder are unnecessary. This makes it possible to detect the reference position OR1 of the light shield member 12 in the absorbance detector 10 of the liquid chromatograph 100 at low cost and with less time and labor.

Furthermore, it is possible to control the rotation position of the light shield member 12 based on a relationship between the detected reference position OR1 and the number of control pulses. Thus, it is possible to rapidly control the light shield member 12 to an arbitrary rotation position during the normal operation without restoring the light shield member 12 to the reference position OR1 after the reference position detection operation.

(8) Other Embodiments

While the light shield member 12 includes the shutter 12a, the first filter 12b, and the second filter 12c in the above-described embodiment, the light shield member 12 may include one or two of the shutter 12a, the first filter 12b, and the second filter 12c.

While the light shield member 12 is attached to the rotation axis 16a of the motor 16 in the above-described embodiment, the light shield member 12 may be driven by the motor 16 through a transmission mechanism such as a gear.

While the reference position of the light shield member 12 is set to the approximate center position in the light shield angle range ΔR in the above-described embodiment, the reference position OR1 of the light shield member 12 is not limited to this. For example, the reference position may be set to an approximate center angle position in a rotation angle range of the motor 16 in which the amount of light received by the photodetector 15 is not less than a predetermined value. For example, in the example of FIG. 4, a reference position OR2 may be set to an approximate center angle position in a rotation angle range of the motor 16 in which the amount of light received by the photodetector 15 is 100%. In this case, in the example of FIG. 4, when one control pulse is applied to the motor 16 from a state where the light shield member 12 is at the initial position, the rotation position of the light shield member 12 is the reference position OR2.

Also, the reference position may be set in a portion that has another specific state or change in the change in the amount of received light. For example, the reference position may be set to the rotation position P1 at which the amount of received light starts to decrease, may be set to the rotation position P2 or the rotation position P4 at which the amount of received light reaches the local maximum value, and may be set to the rotation position P3 or the rotation position P5 at which the amount of received light reaches the local minimum value.

While the light source 11 is a deuterium lamp in the above-described embodiment, the light source 11 may be another lamp such as a tungsten lamp or may be another light emitting element such as a light emitting diode.

While the absorbance detector 10 is used for the liquid chromatograph 100 in the above-described embodiment, the absorbance detector 10 may be used for another chromatograph such as a supercritical fluid chromatograph.

(9) Aspects

The above-mentioned plurality of exemplary embodiments are understood as specific examples of the below-mentioned aspects by those skilled in the art.

(Item 1) An absorbance detector for a chromatograph according to one aspect may include:
- a light source;
- a flow cell that receives light generated by the light source;
- a photodetector that detects light transmitted through the flow cell;
- a light shield member that shields at least part of the light generated from the light source to the flow cell;
- a motor that rotates the light shield member to change the light shield member between a light-shielding state where the light shield member shields at least part of the light generated from the light source to the flow cell and a non-light-shielding state where the light shield member does not shield the light generated from the light source to the flow cell; and
- a reference position detector that rotates the motor and also acquires a change in amount of light received by the photodetector to detect a reference position of the light shield member in a rotation direction of the light shield member based on the acquired change in the amount of the received light.

With the absorbance detector for the chromatograph according to item 1, the reference position of the light shield member is detected based on the change in the amount of light received by the photodetector, which is acquired due to the rotation of the light shield member. As such, an encoder is unnecessary for detecting the reference position of the light shield member. Thus, costs of parts of the encoder, wiring for the encoder, electric power supplied to the encoder, and maintenance of the encoder are unnecessary. This makes is possible to detect the reference position of the light shield member in the absorbance detector at low cost and with less time and labor.

(Item 2) In the absorbance detector for the chromatograph according to item 1, the reference position detector may acquire the change in the amount of the light received by the photodetector to detect the reference position of the light shield member in the rotation direction of the light shield member based on the acquired change in the amount of the received light while the light shield member makes one rotation.

With the absorbance detector for the chromatograph according to item 2, the change in the amount of the light received by the photodetector can be easily acquired by a simple operation.

(Item 3) In the absorbance detector for the chromatograph according to item 1, the reference position detector may detect the reference position of the light shield member based on a rotation position of the light shield member corresponding to a portion that has a specific state or change in the acquired change in the amount of the received light.

With the absorbance detector for the chromatograph according to item 3, it is possible to detect the reference position of the light shield member based on the portion that has the specific state or change depending on the configuration of the light shield member.

(Item 4) In the absorbance detector for the chromatograph according to item 3, the portion that has the specific state or change may be an approximate midpoint in a rotation angle range of the motor in which the amount of the light received by the photodetector is not more than a predetermined value, and the reference position detector may detect the approximate midpoint in the rotation angle range as the reference position.

With the absorbance detector for the chromatograph according to item 4, it is possible to detect the rotation position of the light shield member when the light shield member is substantially perpendicular to a light path from the light source to the flow cell.

(Item 5) In the absorbance detector for the chromatograph according to any one of items 1 to 4, the light shield member may be switched between the light-shielding state and the non-light-shielding state with respect to a rotation angle of the motor at the reference position detected by the reference position detector.

It is possible to identify the rotation angle of the motor in a case where the light shield member is rotated from a stopped state to the reference position. Thus, with the absorbance detector for the chromatograph according to item 5, it is possible to rapidly switch the light shield member between the light-shielding state and the non-light-shielding state by rotating the light shield member from an initial position of the light shield member without restoring the light shield member to the reference position.

(Item 6) In the absorbance detector for the chromatograph according to any one of items 1 to 4, the light shield member may include at least one of a shutter that shields light and one or a plurality of filters that transmit light of a specific wavelength.

With the absorbance detector for the chromatograph according to item 6, switching can be performed between a state where all of light or light of some wavelengths generated by the light source is not led to the flow cell and a state where all of light or light of a specific wavelength generated by the light source is led to the flow cell without use of an encoder.

(Item 7) A reference position detection method according to another aspect may be a reference position detection method of detecting a reference position of a light shield member that shields at least part of light generated from a light source to a flow cell in an absorbance detector and may include the steps of:

generating the light by the light source in the absorbance detector;

rotating the light shield member to change the light shield member between a light-shielding state where the light shield member shields the at least part of the light generated from the light source to the flow cell and a non-light-shielding state where the light shield member does not shield the light generated from the light source to the flow cell;

detecting light transmitted through the flow cell by a photodetector during the rotation of the light shield member; and acquiring a change in amount of light received by the photodetector due to the rotation of the light shield member to detect the reference position in a rotation direction of the light shield member based on the acquired change in the amount of the received light.

With the reference position detection method according to item 7, the reference position of the light shield member is detected based on the change in the amount of the light received by the photodetector, which is acquired due to the rotation of the light shield member. As such, an encoder is unnecessary for detecting the reference position of the light shield member. Thus, costs of parts of the encoder, wiring for the encoder, electric power supplied to the encoder, and maintenance of the encoder are unnecessary. This makes possible to detect the reference position of the light shield member in the absorbance detector at low cost and with less time and labor.

(Item 8) In the reference position detection method according to item 7, the step of changing the light shield member may include changing the light shield member between the light-shielding state and the non-light-shielding state by a motor, and the step of detecting the reference position may include detecting an approximate midpoint in a rotation angle range of the motor in which the amount of the light received by the photodetector is not more than a predetermined value.

The invention claimed is:

1. An absorbance detector for a chromatograph comprising:

a light source;

a flow cell that receives light generated by the light source;

a photodetector that detects light transmitted through the flow cell;

a light shield member that is rotatably arranged in a light path from the light source to the flow cell and shields at least part of the light in the light path;

a motor that rotates the light shield member to change the light shield member between a light-shielding state where the light shield member shields at least part of the light generated from the light source to the flow cell and a non-light-shielding state where the light shield member does not shield the light generated from the light source to the flow cell;

a reference position detector that rotates the motor to rotate the light shield member from an arbitrary initial position in a rotation direction, and also acquires a change in amount of light received by the photodetector to detect a rotation position of the light shield member when the light shield member is at a predetermined certain angle to the light path, the rotation position of the light shield member being a relative rotation position with respect to the initial position, as a reference position of the light shield member in the rotation direction of the light shield member based on the acquired change in the amount of the received light during a reference position detection operation before a normal operation of detecting absorbance of a sample; and a normal operation controller that controls a rotation position of the motor based on the reference position detected by the reference position detector in a state where the sample flows into the flow cell to change the light shield member between the light-shielding state and the non-light-shielding state during the normal operation.

2. An absorbance detector for a chromatograph comprising:

a light source;

a flow cell that receives light generated by the light source;

a photodetector that detects light transmitted through the flow cell;

a light shield member that shields at least part of the light generated from the light source to the flow cell;

a motor that rotates the light shield member to change the light shield member between a light-shielding state where the light shield member shields at least part of the light generated from the light source to the flow cell and a non-light-shielding state where the light shield member does not shield the light generated from the light source to the flow cell; and a reference position detector that rotates the motor and also acquires a change in amount of light received by the photodetector to detect a reference position of the light shield member in a rotation direction of the light shield member based on the acquired change in the amount of the received light, wherein the reference position detector acquires the change in the amount of the light received by the photodetector to detect the reference position of the light shield member in the rotation direction of the light shield member based on the acquired change in the amount of the received light while the light shield member makes one rotation.

3. The absorbance detector for the chromatograph according to claim 1, wherein the reference position detector detects the reference position of the light shield member based on a rotation position of the light shield member corresponding to a portion that has a specific state or change in the acquired change in the amount of the received light.

4. The absorbance detector for the chromatograph according to claim 3, wherein the portion that has the specific state or change is an approximate midpoint in a rotation angle range of the motor in which the amount of the light received by the photodetector is not more than a predetermined value, and the reference position detector detects the approximate midpoint in the rotation angle range as the reference position.

5. The absorbance detector for the chromatograph according to claim 1, wherein the light shield member is switched between the light-shielding state and the non-light-shielding state with respect to a rotation angle of the motor at the reference position detected by the reference position detector.

6. The absorbance detector for the chromatograph according to claim 1, wherein the light shield member includes at least one of a shutter that shields light and one or a plurality of filters that transmit light of a specific wavelength.

7. A reference position detection method of detecting a reference position of a light shield member that is rotatably arranged in a light path from a light source to a flow cell in an absorbance detector and shields at least part of light in the light path, comprising the steps of:

generating the light by the light source in the absorbance detector;

rotating the light shield member from an arbitrary initial position in a rotation direction by a motor to change the light shield member between a light-shielding state where the light shield member shields the at least part of the light generated from the light source to the flow cell and a non-light-shielding state where the light shield member does not shield the light generated from the light source to the flow cell during a reference position detection operation before a normal operation of detecting absorbance of a sample;

detecting light transmitted through the flow cell by a photodetector during the rotation of the light shield member during the reference position detection operation;

acquiring a change in amount of light received by the photodetector due to the rotation of the light shield member to detect a rotation position of the light shield member when the light shield member is at a predetermined certain angle to the light path, the rotation position of the light shield member being a relative rotation position with respect to the initial position, as the reference position in the rotation direction of the light shield member based on the acquired change in the amount of the received light during the reference position detection operation; and controlling a rotation position of the motor based on the detected reference position in a state where the sample flows into the flow cell to change the light shield member between the light-shielding state and the non-light-shielding state during the normal operation.

8. The reference position detection method according to claim 7, wherein the step of changing the light shield member includes changing the light shield member between the light-shielding state and the non-light-shielding state by a motor, and the step of detecting the reference position includes detecting an approximate midpoint in a rotation angle range of the motor in which the amount of the light received by the photodetector is not more than a predetermined value.

* * * * *